(12) United States Patent
Lai et al.

(10) Patent No.: US 8,680,698 B1
(45) Date of Patent: Mar. 25, 2014

(54) SELF-CONTAINED MECHANISM FOR THE CONVERSION OF VERTICAL MOTION TO ROTATIONAL/TRANSLATIONAL MOTION

(71) Applicant: Secretary of the Navy, China Lake, CA (US)

(72) Inventors: William W. Lai, Ridgecrest, CA (US); Alfred J. Baca, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/727,176

(22) Filed: Dec. 26, 2012

Related U.S. Application Data

(63) Continuation-in-part of application No. 13/495,278, filed on Jun. 13, 2012.

(51) Int. Cl.

| F02B 63/04 | (2006.01) |
|---|---|
| F03G 7/08 | (2006.01) |
| H02K 7/18 | (2006.01) |
| F03B 13/00 | (2006.01) |
| H02P 9/04 | (2006.01) |
| A43B 13/20 | (2006.01) |
| H02K 7/00 | (2006.01) |
| H02K 33/00 | (2006.01) |

(52) U.S. Cl.
USPC ........ 290/1 R; 290/54; 36/29; 36/88; 310/17; 310/30

(58) Field of Classification Search
USPC ................ 290/1 R, 54; 36/29, 88; 310/17, 30
See application file for complete search history.

(56) References Cited

U.S. PATENT DOCUMENTS

| 5,167,082 | A | * | 12/1992 | Chen .................................. 36/2.6 |
|---|---|---|---|---|
| 5,347,186 | A | * | 9/1994 | Konotchick ..................... 310/17 |
| 5,495,682 | A | * | 3/1996 | Chen .................................. 36/2.6 |
| 5,818,132 | A | * | 10/1998 | Konotchick ..................... 310/17 |
| 5,860,727 | A | * | 1/1999 | Chien ............................... 362/84 |
| 5,918,381 | A | * | 7/1999 | Landry ........................... 36/3 B |
| 6,182,378 | B1 | * | 2/2001 | Sendaula .......................... 36/29 |
| 6,201,314 | B1 | | 3/2001 | Landry ............................. 290/54 |
| 6,220,719 | B1 | * | 4/2001 | Vetorino et al. ............... 362/192 |
| 6,239,501 | B1 | * | 5/2001 | Komarechka ................. 290/1 R |
| 6,255,799 | B1 | | 7/2001 | Le et al. ........................ 320/107 |
| 6,281,594 | B1 | * | 8/2001 | Sarich ........................... 290/1 R |
| 6,744,145 | B2 | * | 6/2004 | Chang .......................... 290/1 R |
| 6,768,230 | B2 | * | 7/2004 | Cheung et al. .................. 310/30 |
| 6,798,090 | B2 | * | 9/2004 | Cheung et al. .................. 310/17 |
| 6,809,427 | B2 | * | 10/2004 | Cheung et al. ............... 290/1 R |
| 6,812,583 | B2 | * | 11/2004 | Cheung et al. ............... 290/1 R |
| 6,812,598 | B2 | * | 11/2004 | Cheung et al. .................. 310/30 |
| 6,861,772 | B2 | * | 3/2005 | Cheung et al. .................. 310/30 |
| 6,865,825 | B2 | * | 3/2005 | Bailey et al. ...................... 36/88 |
| 6,936,937 | B2 | * | 8/2005 | Tu et al. ..................... 310/12.12 |
| 7,009,310 | B2 | * | 3/2006 | Cheung et al. ............... 290/1 R |
| 7,107,706 | B1 | * | 9/2006 | Bailey et al. ...................... 36/88 |
| 7,148,583 | B1 | * | 12/2006 | Shau et al. .................... 290/1 R |

(Continued)

*Primary Examiner* — Pedro J Cuevas
(74) *Attorney, Agent, or Firm* — James M. Saunders

(57) ABSTRACT

A self-contained mechanism for the conversion of vertical motion to rotational/transitional motion includes a substrate having at least one interior compartment, at least one nonconductive tube, at least one permanent magnet, and at least one coil of wire. The coil of wire is a solenoid. The nonconductive tube, permanent magnet, and solenoid are configured to fit in the interior compartment.

20 Claims, 3 Drawing Sheets

(56) References Cited

U.S. PATENT DOCUMENTS

| | | | |
|---|---|---|---|
| 7,204,041 B1 * | 4/2007 | Bailey et al. | 36/29 |
| 7,219,449 B1 * | 5/2007 | Hoffberg et al. | 36/88 |
| 7,288,860 B2 * | 10/2007 | Cheung et al. | 310/12.12 |
| 7,309,934 B2 * | 12/2007 | Tu et al. | 310/12.12 |
| 7,327,046 B2 * | 2/2008 | Biamonte | 290/1 R |
| 7,362,003 B2 * | 4/2008 | Stewart et al. | 290/42 |
| 7,395,614 B1 * | 7/2008 | Bailey et al. | 36/28 |
| 7,431,474 B2 * | 10/2008 | Mah | 362/192 |
| 7,498,682 B2 * | 3/2009 | Lemieux | 290/1 R |
| 7,692,320 B2 * | 4/2010 | Lemieux | 290/1 R |
| RE41,626 E * | 9/2010 | Cheung et al. | 310/30 |
| 7,952,238 B2 * | 5/2011 | Tu et al. | 310/12.24 |
| 7,956,476 B2 | 6/2011 | Yang | 290/1 R |
| 7,989,971 B2 * | 8/2011 | Lemieux | 290/1 R |
| 2003/0155771 A1 * | 8/2003 | Cheung et al. | 290/1 R |
| 2003/0197433 A1 * | 10/2003 | Cheung et al. | 310/14 |
| 2004/0155467 A1 * | 8/2004 | Cheung et al. | 290/1 R |
| 2012/0260522 A1 * | 10/2012 | Shi et al. | 36/2.6 |
| 2012/0260531 A1 * | 10/2012 | Shi et al. | 36/102 |
| 2013/0033042 A1 * | 2/2013 | Fortier et al. | 290/54 |

\* cited by examiner

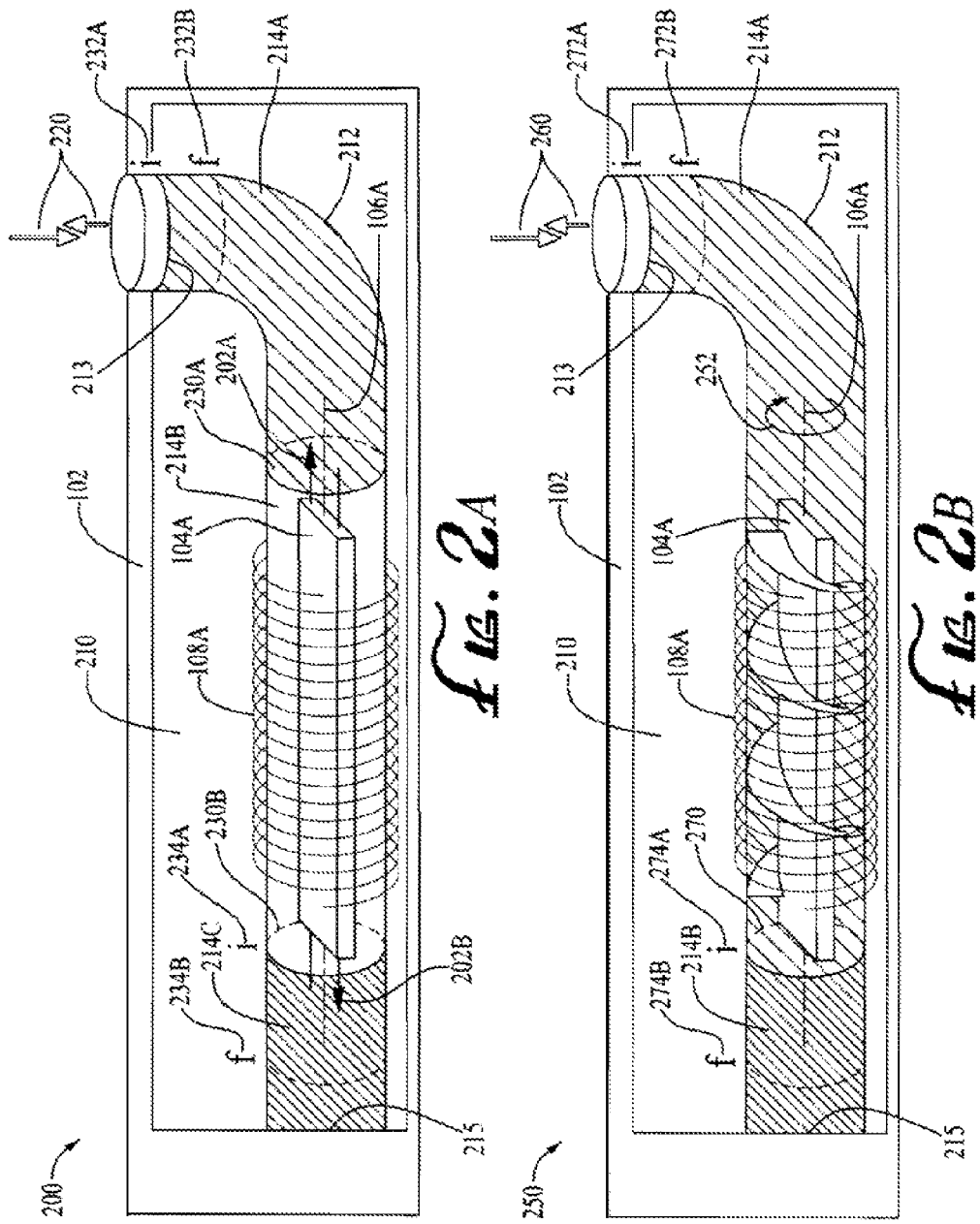

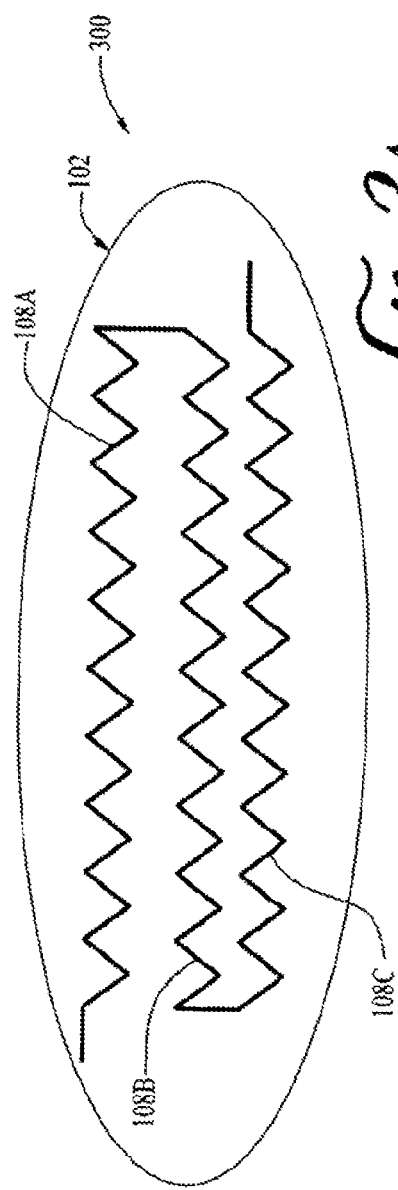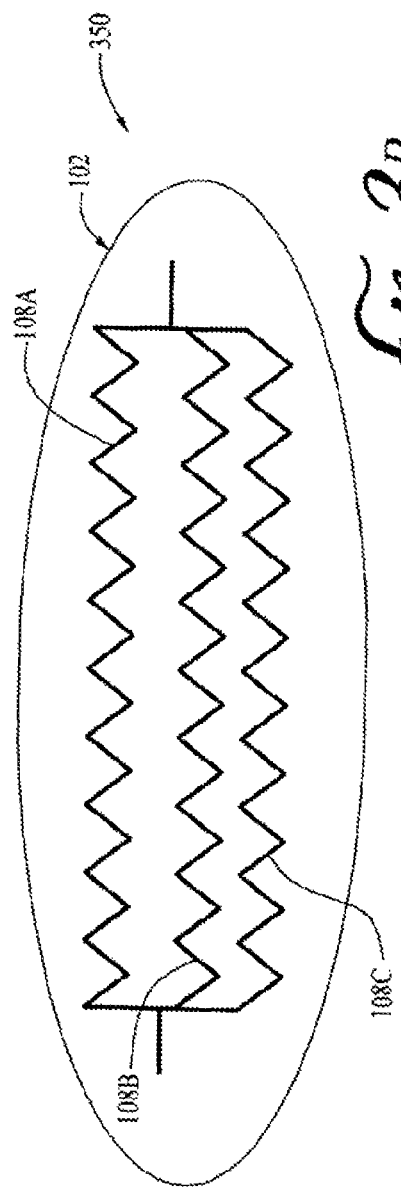

SELF-CONTAINED MECHANISM FOR THE CONVERSION OF VERTICAL MOTION TO ROTATIONAL/TRANSLATIONAL MOTION

CROSS-REFERENCE TO RELATED APPLICATIONS

This is a continuation-in-part application, claiming the benefit of parent non-provisional application Ser. No. 13/495,278 filed on Jun. 13, 2012, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to energy harvesting, and more particularly, to a footwear apparatus for harvesting magnetic and electrical energy by converting vertical motion to translational or rotational motion.

BRIEF DESCRIPTION OF THE DRAWINGS

FIG. 2A is a partial elevation/perspective view of a mechanism to convert vertical motion to translational motion, according to embodiments of the invention.

FIG. 2B is a partial elevation/perspective view of a mechanism to convert vertical motion to rotational motion, according to embodiments of the invention.

FIG. 3A is a plan view of a hybrid system for harvesting magnetic and electrical energy with solenoids connected in series, according to embodiments of the invention.

FIG. 3B is a plan view of a hybrid system for harvesting magnetic and electrical energy with solenoids connected in parallel, according to embodiments of the invention.

Figure 1:
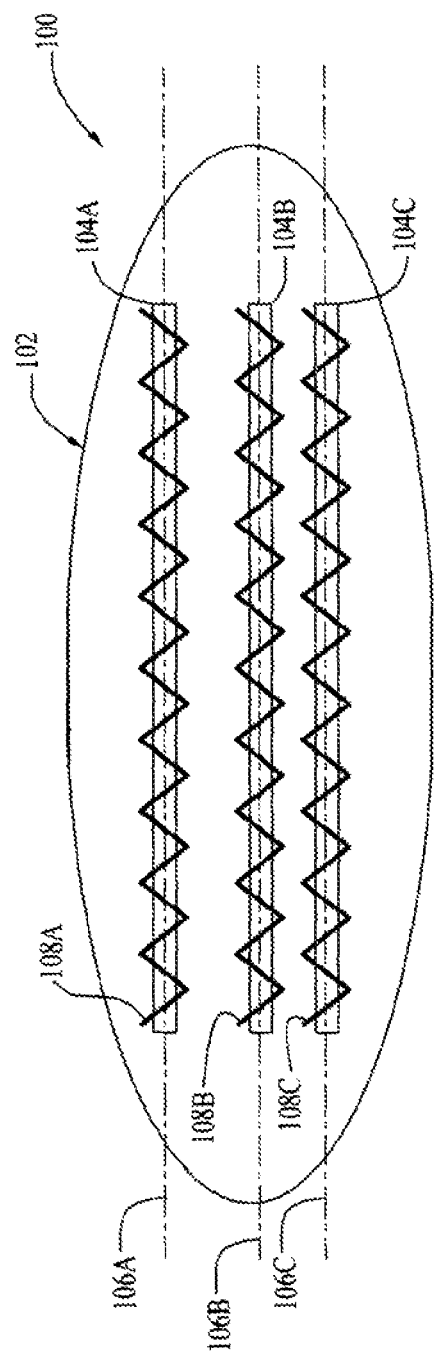
FIG. 1 is a plan view of a hybrid system for harvesting magnetic and electrical energy, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to energy harvesting, and more particularly, to a footwear apparatus for harvesting magnetic and electrical energy by converting vertical motion to translational or rotational motion. The average person takes between five and seven thousand steps each day. The ability to harvest energy from each step, however small, can result in a substantial total daily value. In turn, this can then be readily applied to personal communications equipment and other devices having low energy requirements.

There have been many attempts to harvest the energy resulting from compression and decompression of heel strikes. Although this is an emerging technology, the amount of energy collected is severely limited by the displacement of the compression/decompression distance. When incorporated into a shoe, this would result in a displacement range between live and ten cm. Any more than that would result in an abnormal change in the normal gait of a person. The result of which would offset any additional enemy collection by increased fatigue or abnormal wear and tear on joints.

The limitations of energy harvesting by mechanical means can be avoided by using a system that can multiply the effects of each small displacement. Harvesting energy by way of magnetic induction is one such way of multiplying the effective distance that is displaced with each step. Another benefit of using magnetic induction for energy harvesting is the device can make use of both moving and non-moving parts of a shoe, which allows the entire sole to be used as an energy harvester.

Although embodiments of the invention are described in considerable detail, including references to certain versions thereof, other versions are possible. Examples of other versions include performing alternate combinations and sequencing of the materials to enhance energy harvesting based on application-specific conditions. Therefore, the spirit and scope of the appended claims should not be limited to the description of versions included herein.

In the accompanying drawings, like reference numbers indicate like elements. FIG. 1 illustrates a plan view of a hybrid system for harvesting magnetic and electrical energy, according to embodiments of the invention. Reference character 100 depicts an apparatus of embodiments of the invention. FIG. 2A illustrates a partial elevation/perspective view of a mechanism to convert vertical motion to translational motion, according to embodiments of the invention, and is depicted as reference character 200. Components may exist singularly or in pluralities, even though depicted as one or the other in the figures for simplified viewing, without detracting from the merits or generality of embodiments of the invention.

Referring simultaneously to FIGS. 1 and 2A, embodiments of the invention generally relate to a self-contained energy harvesting device for converting vertical motion to lateral motion in footwear, including a substrate 102 having at least one interior compartment 210 (FIG. 2A). At least one nonconductive tube 212 is configured to fit in the interior compartment 210 (FIG. 2A). The nonconductive tube has a first end 213 and a second end 215. At least one permanent magnet 104A, B, and C is configured to fit in the nonconductive tube 212 (FIG. 2A). Each permanent magnet 104A, B, and C has a central longitudinal axis 106A, B, and C.

At least one coil of wire 108A, B, and C equal in number to the permanent magnets 104A, B, and C is provided. Each coil of wire 108A, B, and C is configured to fit circumferentially around each permanent magnet 104A, B, and C. Each coil of wire is configured to fit in the interior compartment 210 (FIG. 2A).

The nonconductive tube includes a first compartment 214A configured to house a non-compressible fluid. A second compartment 214B is adjacent to the first compartment and is configured to house the permanent magnets 104A, B, and C. A third compartment 214C is adjacent to the second compartment and is configured to house a compressible fluid.

The permanent magnet 104A, B, and C is attached on opposite ends to backing plates 230A and 230B. The plates 230A/B are configured to isolate the first, second, and third compartments 214A, B, and C, respectively, and to slide within the nonconductive tube 212 while isolating non-compressible fluid in the first compartment and compressible fluid in the third compartment. The second compartment 214B does not house fluid.

The permanent magnet 104A, B, and C is configured to move laterally back and forth along the central longitudinal axis 106A, B, and C when a compressive heel strike force 220 is applied to and released from the substrate 102. The compressive heel strike force 220 compresses the substrate 102 at the first end 213 of the nonconductive tube 212 and pushes non-compressible fluid in the first compartment 214A from an initial position, i, 232A to a final position, f, 232B. Non-compressible fluid pushes against backing plate 230A, driving the permanent magnet 104A, B, and C in direction 202B. Backing plate 230B is driven against the compressible fluid in the third compartment 214C, from an initial position, i, 234A to a final position, f, 234B.

Upon release of the compressive heel strike force 220, the compressible fluid in the third compartment 214C decompresses from the final position, f, 234B, to the initial position, i, 234A and against backing plate 230B. Decompression drives the permanent magnet 104A, B, and C in direction 202A against hacking plate 230A. Backing plate 230A drives the non-compressible fluid in the first compartment 214A from final position, f, 232B to initial position, i, 232A.

FIG. 2B illustrates a partial elevation/perspective view of a mechanism to convert vertical motion to rotational motion, according to embodiments of the invention, and is depicted as reference character 250. Referring simultaneously to FIGS. 1 and 2B, another embodiment of the invention generally relates to a self-contained energy harvesting device for converting vertical motion to rotational motion in footwear, and includes a substrate 102 having at least one interior compartment 210. At least one nonconductive tube 212 is configured to fit in the interior comp compartment 210. The nonconductive tube 212 has a first end 213 and a second end 215.

At least one series of permanent magnetic blades 104A, B, and C is configured to fit in the nonconductive tube 212. Each series of permanent magnetic blades 104A, B, and C has a central longitudinal axis 106A, B, and C. At least one coil of wire 108A, B, and C equal in number to the series of permanent magnetic blades 104A, B, and C is provided.

Each coil of wire 108A, B, and C is configured to fit circumferentially around each of the series of permanent magnetic blades 104A, B, and C. Each coil of wire 108A, B, and C is configured to fit in the interior compartment 210. The nonconductive tube 212 includes a first compartment 214A configured to house a non-compressible fluid and the series of permanent magnetic blades 104A, B, and C. A second compartment 214B is adjacent to the first compartment 214A and is configured to house a compressible fluid. Backing plate 270 is configured to isolate the first and second compartments 214A and B and to slide within the nonconductive tube 212, while maintaining isolation of the non-compressible fluid in the first compartment and compressible fluid in the second compartment.

The permanent magnetic blades 104A, B, and C are configured to rotationally spin back and forth about the central longitudinal axis 106A, B, and C when a compressive heel strike force 260, is applied to and released from the substrate 102. The compressive heel strike force 260 compresses the substrate 102 at the first end 213 of the nonconductive tube 212 and pushes the non-compressible fluid in the first compartment 214A from an initial position, i, 272A to a final position, f, 272B. Non-compressible fluid flows through and drives the permanent magnetic blades 104A, B, and C, causing the permanent magnetic blades to rotate. The rotation is depicted as reference character 252. Although reference character 252 depicts clockwise rotation, counterclockwise rotation is also possible during compression since rotation direction is the result of blade orientation. The non-compressible fluid in the first compartment 214A drives backing plate 270 against the compressible fluid in the second compartment 214B, from an initial position, i, 274A to a final position, f, 274B.

Upon release of the compressive heel strike force 260, the compressible fluid in the second compartment 21413 decompresses from the final position, f, 274B to the initial position, i, 274A, and against backing plate 270. Decompression drives the non-compressible fluid through the permanent magnetic blades 104A, B, and C, causing the permanent magnetic blades to rotate in the opposite direction about the central longitudinal axis 106A, B, and C. The non-compressible fluid in the first compartment 214A returns from the final position, f, 272B back to the initial position, i, 272A.

In embodiments, the rotational spin is depicted as reference character 252. A bar/screw device (not shown) may span the length of the permanent magnets/magnetic blades 104A, B, and C connecting the permanent magnet/magnetic blades such as, for example, through the central longitudinal axis 106A, B, and C, to a side of the substrate 102. For example, the bar/screw device (not shown) may extend through the permanent magnet/magnetic blades 104A, B, and C and through the second end 215 of the nonconductive tube 212.

In embodiments, connections/attachments may be by any method that does not interfere with magnetic induction such as, for example, by glue. Thus, the nonconductive tube 212 may be attached to the substrate 102 with glue at the first end 213 and the second 215. Likewise, connections with backing plates 230A and 230B (FIG. 2A) to the permanent magnet 104A, B, and C may be with glue.

The nonconductive tube 212 is selected from the group of nonconductive materials consisting of plastics, rubber, and inorganic polymers. Diamagnetic metals and diamagnetic alloys may also be used for the nonconductive tube 212. Any perforations through the nonconductive tube 212 to secure apparatus components, when needed, are sealed to maintain structural integrity and fluid tightness. The embodiments depicted in FIGS. 2A and 2B are exaggerated at the first end 213 of the nonconductive tube 212 for ease of viewing the heel strike forces 220 and 260, respectively.

In embodiments, an example of a non-compressible fluid includes, but is not limited to, water. A person having ordinary skill in the art will recognize that water has a density of about 1.0 g/cm$^3$. Examples of compressible fluids include synthetic materials such as, for example, silica gels, carbon gels, and alumina gels and are sometimes referred to as aerogels or hydrogels. The compressible fluids have density ranges less than 1.0 g/cm$^3$ and are approximately in the range from about 0.3 g/cm$^3$ to 0.9 g/cm$^3$.

In some embodiments, the interior compartment 210 (FIGS. 2A and 2B) is a void, while in other embodiments the interior compartment may be partially filled with a compressible material to aid in a wearer's comfort such as, for example, foam. The substrate 102 is configured to it within the confines of a shoe. In other embodiments, the substrate 102 is configured to removably fit within the confines of a shoe.

The coil of wire 108A, B, and C is configured to fit circumferentially around the nonconductive tube 212 and is attached to the substrate 102. Although the specific attachment mechanism is not shown for ease of viewing, the coil of wire 108A, B, and C may be attached on any side of the substrate 102 and by an appropriate attachment mechanism such as, for example, brackets, glue, and screws. The coil of wire 108A, B, and C is at least one solenoid. In some embodiments, the coil of wire 108A, B, and C is connected in series (FIG. 3B) to increase voltage output. In other embodiments, the coil of wire 108A, B, and C is connected in parallel (FIG. 3B) to increase current output. The varying hatching in FIGS. 2A and B are representative only to depict different materials and are not to be construed as limiting.

FIG. 3A is a plan view of a hybrid system for harvesting magnetic and electrical energy with solenoids connected in series, according to embodiments of the invention and is depicted as reference character 300. FIG. 3B is a plan view of a hybrid system for harvesting magnetic and electrical energy with solenoids connected in parallel, according to embodiments of the invention and is depicted as reference character 350. For ease of viewing specific component orientations and connections, permanent magnets/magnetic blades 104A, B, and C (shown in FIG. 1) and central longitudinal axes 106A, B, and C (shown in FIG. 1) are not shown in FIG. 3A or 3B.

Referring simultaneously to FIGS. 1 through 3B, embodiments of the invention can take several formats. In embodiments, the substrate 102 is an insole of a shoe. The substrate 102 may also be a sole or part of a sole of a shoe, including the heel portion. A person having ordinary skill in the art will recognize that an insole is sometimes referred to as an insert. The substrate 102 may also be referred to as a platform without detracting from the merits or generality of embodiments of the invention. The substrate 102 exhibits appropriate rigidity necessary for a user's shoe/boot.

In embodiments, a person having ordinary skill in the art will recognize that the term permanent magnet is a material exhibiting a persistent magnetic field even without the application of external energy. Harvested energy can be stored in devices capable of storing electrical charge such as, for example, batteries and capacitors.

Lateral movement corresponds to alternating current (AC) power. An example of lateral movement: includes back 202A and forth 202B (FIG. 2A) movement. Rotational spin corresponds to direct current (DC) power. A rotational spin example includes clockwise/counterclockwise rotation, shown as reference character 252 in FIG. 2B.

Since magnetic fields are additive, the magnetic field is maximized when all permanent magnets/magnetic blades 104A, B, and C move laterally or rotate. Although, embodiments of the invention do allow for some magnets to move laterally and others to rotate, an alternator would be needed for the independent systems.

The solenoids 108A, B, and C can span the entire length of the substrate 102. A reason for this not to occur is to allow room for a mechanism that would allow for the permanent magnets/magnetic blades 104A, B, and C to move either laterally or rotationally, depending on the particular operating environment. Additionally, the span of the solenoids 108A, B, and C can be limited in cases where all the energy generation is localized in the heel.

In embodiments, the permanent magnets/magnetic blades 104A, B, and C are selected from the group of rare earth elements such as, for example, neodymium and europium. The solenoids 108A, B, and C are conductive materials having a zero or low energy band gap between valence and conduction bands. Metals and metal oxides are suitable materials having a zero energy band gap (0 eV). Semiconductors are suitable materials having a low energy band gap, defined as greater than 0 eV and less than 1.2 eV. Band gap energy closer to 0 eV results in less charge loss. Since the power generation/output is proportional to the density of the coil 108A, B, and C and strength of the permanent magnets/magnetic blades 104A, B, and C, the solenoid/magnet placement/number can be such that the maximum allowable space of the substrate 102 (sole insert) is filled.

The solenoids 108A, B, and C are a succession of tightly wound coils of wires. Within these coils 108A, B, and C and along the central longitudinal axis 106A, B, and C is where the permanent magnets/magnetic blades 104A, B, and C reside. A person having ordinary skill in the art will recognize that, according to the Right Hand rule, current is generated whenever there is a change in the magnetic field within the solenoid 108A, B, and C so either or both parts (magnet 104A, B, and C/solenoid 108A, B, and C) can move. In practice, it is more feasible for the solenoid 108A, B, and C to be the stationary component and the magnet 104A, B, and C to be the mobile component. Because of the perturbation of the magnetic field, any movement, either laterally or rotationally will induce a current.

Depending on application specific conditions and power requirements, the solenoids 108A, B, and C can either be interconnected in a series or parallel. Changing the configuration allows for the increase of either voltage or current output, depending on the application. The energy to drive the magnet's rotation is provided by the force exerted by a heel step. Vertical displacements can be readily converted to rotational energy. By varying the number of rotations per distance unit, each heel step can translate to dozens of rotations along the screw axis.

One having ordinary skill in the art will recognize that embodiments of the invention can be used with a shoe, boot, slipper, or any durable apparel item fitted to a human foot, without detracting from the merits or generality of embodiments of the invention. Furthermore, the concepts embodied herein are equally applicable to other species that can make use of durable wear items fitted to their feet. Further research includes, but is not limited to, identifying alternative mechanisms for the translational and rotational movement of the magnets 104A, B, and C.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:
1. A self-contained energy harvesting device for converting vertical motion to lateral motion in footwear, comprising:
   a substrate having at least one interior compartment;
   at least one nonconductive tube configured to fit in said at least one interior compartment, wherein said at least one nonconductive tube has a first end and a second end;

at least one permanent magnet configured to fit in said at least one nonconductive tube, wherein each of said at least one permanent magnet has a central longitudinal axis; and at least one coil of wire equal in number to said at least one permanent magnet, wherein each of said at least one coil of wire is configured to fit circumferentially around each of said at least one permanent magnet, wherein each of said at least one coil of wire is configured to fit in said at least one interior compartment.

2. The device according to claim 1, wherein said substrate is configured to fit within the confines of a shoe.

3. The device according to claim 1, wherein said substrate is configured to removably fit within the confines of a shoe.

4. The device according to claim 1, wherein said at least one interior compartment is a void.

5. The device according to claim 1, wherein said at least one nonconductive tube is selected from the group of nonconductive materials consisting of plastics, rubber, and inorganic polymers.

6. The device according to claim 1, wherein said at least one nonconductive tube, comprises:
   a first compartment configured to house a noncompressible fluid;
   a second compartment adjacent to said first compartment, wherein said second compartment is configured to house said at least one permanent magnet; and
   a third compartment adjacent to said second compartment, wherein said third compartment is configured to house a compressible fluid.

7. The device according to claim 1, wherein said at least one permanent magnet is configured to move laterally back and forth along said central longitudinal axis when a compressive heel strike force is applied to and released from said substrate.

8. The device according to claim 1, wherein said at least one coil of wire is at least one solenoid, wherein said at least one solenoid is attached to said substrate.

9. The device according to claim 1, wherein said at least one coil of wire is connected in series to increase voltage output.

10. The device according to claim 1, wherein said at least one coil of wire is connected in parallel to increase current output.

11. A self-contained energy harvesting device for converting vertical motion to rotational motion in footwear, comprising:
    a substrate having at least one interior compartment;
    at least one nonconductive tube configured to fit in said at least one interior compartment, wherein said at least one nonconductive tube has a first end and a second end;
    at least one series of permanent magnetic blades configured to fit in said at least one nonconductive tube, wherein each of said at least one series of permanent magnetic blades has a central longitudinal axis; and
    at least one coil of wire equal in number to said at least one series of permanent magnetic blades, wherein each of said at least one coil of wire is configured to fit circumferentially around each of said at least one series of permanent magnetic blades, wherein each of said at least one coil of wire is configured to fit in said at least one interior compartment.

12. The device according to claim 11, wherein said substrate is configured to fit within the confines of a shoe.

13. The device according to claim 11, wherein said substrate is configured to removably fit within the confines of a shoe.

14. The device according to claim 11, wherein said at least one interior compartment is a void.

15. The device according to claim 11, wherein said at least one nonconductive tube is selected from the group of nonconductive materials consisting of plastics, rubber, and inorganic polymers.

16. The device according to claim 11, wherein said at least one nonconductive tube, comprises:
    a first compartment configured to house a noncompressible fluid and said at least one series of permanent magnetic blades; and
    a second compartment adjacent to said first compartment, wherein said second compartment is configured to house a compressible fluid.

17. The device according to claim 11, wherein said at least one series of permanent magnetic blades is configured to rotationally spin back and forth about said central longitudinal axis when a compressive heel strike force is applied to and released from said substrate.

18. The device according to claim 11, wherein said at least one coil of wire is at least one solenoid, wherein said at least one solenoid is attached to said substrate.

19. The device according to claim 11, wherein said at least one coil of wire is connected in series to increase voltage output.

20. The device according to claim 11, wherein said at least one coil of wire is connected in parallel to increase current output.

* * * * *